US007051083B1

(12) United States Patent
Graf et al.

(10) Patent No.: US 7,051,083 B1
(45) Date of Patent: May 23, 2006

(54) ADDRESSING IN A COMMUNICATIONS NETWORK COMPRISING CALL CONTROL LEVEL AND BEARER CONTROL LEVEL BY UTILIZING NETWORK SERVICE ACCESS POINT (NSAP) ADDRESSING FORMAT

(75) Inventors: Leslie Graf, Melbourne (AU); Mark Hollis, Park Orchards (AU); Stephen Terrill, Stockholm (SE); Christian Groves, Keilor (AU); Ian Rytina, Stockholm (SE); Juan Noguera-Rodriguez, Victoria (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 760 days.

(21) Appl. No.: 09/678,364

(22) Filed: Sep. 29, 2000

(30) Foreign Application Priority Data

Oct. 1, 1999 (GB) .................................. 9923121

(51) Int. Cl.
 *G06F 15/16* (2006.01)

(52) U.S. Cl. .................... 709/218; 709/245; 370/401
(58) Field of Classification Search ........ 709/200–310; 370/352, 401; 455/436
See application file for complete search history.

(56) References Cited

U.S. PATENT DOCUMENTS

| 5,896,440 A | * | 4/1999 | Reed et al. | ................ 379/9.03 |
| 6,396,840 B1 | * | 5/2002 | Rose et al. | ................ 370/401 |
| 6,434,140 B1 | * | 8/2002 | Barany et al. | ............. 370/352 |
| 6,490,451 B1 | * | 12/2002 | Denman et al. | ........... 455/436 |

FOREIGN PATENT DOCUMENTS

| EP | 0907303 | 4/1999 |
| JP | 7273834 | 10/1995 |

OTHER PUBLICATIONS

Pancha, P., "*ATM Switch Routers for Combined Connection-Oriented and Connectionless Transport*", Proceedings of the International Switching Symposium, Toronto, Canada, pp. 261-269 (Sep. 1997).

"*Data Networks and Open System Communications: Open Systems Interconnection—Network Serivce Definitions*", ITU-T Recommendation X.213 (Nov., 1995).

* cited by examiner

*Primary Examiner*—Nabil El-Hady
(74) *Attorney, Agent, or Firm*—Roger Burleigh

(57) ABSTRACT

A method of signalling in a telecommunications system that includes a Call Control level and a Bearer Control level, where the Call Control level includes a plurality of Media Gateway Controllers and the Bearer Control level includes a plurality of Media Gateways, each of which is controlled by a Media Gateway Controller. The method includes allocating to each Media Gateway at least one address that corresponds to one of a plurality of different addressing formats, and conveying these addresses between peer Media Gateway Controllers by encapsulating them using a Network Service Access Point addressing format.

6 Claims, 3 Drawing Sheets

→ BICC Signalling
⋯⋯> Q.2630.1 Signalling

ADDRESSING IN A COMMUNICATIONS NETWORK COMPRISING CALL CONTROL LEVEL AND BEARER CONTROL LEVEL BY UTILIZING NETWORK SERVICE ACCESS POINT (NSAP) ADDRESSING FORMAT

This application claims priority under 35 U.S.C. §§ 119 and/or 365 to 9923121.9 filed in United Kingdom on Oct. 1, 1999; the entire content of which is hereby incorporated by reference.

BACKGROUND

The present invention relates to addressing in a communications network and in particular to addressing in a communications network in which network nodes are split into a call control part and a bearer control part.

Telecommunications networks currently rely to a large extent upon the Signalling System no.7 (SS7) as the mechanism for controlling call connections and for handling the transfer of signalling information between signalling points of the networks. Typically, one or more application and user parts at a given signalling point will make use of SS7 to communicate with peer application and user parts at some other signalling point. Examples of user parts are ISUP (ISDN User Part) and TUP (Telephony User Part) whilst examples of application parts are INAP (Intelligent Network Application Part) and MAP (Mobile Application Part). The conventional SS7 protocol stack includes Message Transfer Parts MTP1, MTP2, and MTP3 which handle the formatting of signalling messages for transport over the physical layer as well as various routing functions.

There has been considerable interest of late amongst the telecommunications community in using non-standard (i.e. non-conventional within the telecommunications industry) signalling transport mechanisms in telecommunications networks in place of the conventional SS7 mechanisms. The reasons for this are related both to improvements in efficiency as well as potential cost savings. Much consideration has been given for example to the use of Internet Protocol (IP) networks to transport signalling information between signalling points. IP networks have the advantage that they make efficient use of transmission resources by using packet switching and are relatively low in cost due to the widespread use of the technology (as opposed to specialised telecommunication technology). There is also interest in using other transport mechanisms including AAL1/2/5, FR etc.

ISUP, which deals with the setting-up and control of call connections in a telecommunications network, is closely linked to the SS7 signalling transport mechanism and does not readily lend itself to use with other non-standard transport technologies such as IP and AAL2. As such, several standardisation bodies including the ITU-T, ETSI, and ANSI, are currently considering the specification of a signalling protocol for the control of calls, which is independent of the underlying transport mechanism. This is illustrated in FIG. 1 and can be viewed as separating out from the protocol, Bearer Control functions which relate merely to establishing the parameters (including the start and end points) of the "pipe" via which user plane data is transported between nodes, and which are specific to the transport mechanism. The new protocol, referred to as Bearer Independent Call Control (BICC) or Transport Independent Call Control (TICC), retains Call Control functions such as the services invoked for a call between given calling and called parties (e.g. call forwarding), and the overall routing of user plane data.

The new network architecture resulting from the separation of the Call and Bearer Control levels results in an open interface appearing between a Call Control entity and a Bearer Control entity, where these entities are referred to as a Media Gateway Controller and a Media Gateway respectively. The open interface is referred to hereinafter as X-CP, examples of which are the MEGACO work of the IETF and the H.248 work of ITU Study Group 16 (SG16). It is envisaged that a given Media Gateway Controller may control several Media Gateways.

Despite the decoupling of the Call and Bearer Control levels, it remains necessary to convey information about the Bearer Control level at the Call Control level in order to establish bearer connections between Media Gateways for a call. In particular, it is necessary to convey on a per call basis the addresses of Media Gateways between peer Media Gateway Controllers, where the identified Media Gateways are responsible for handling the bearer connection for the call. Current proposals are to provide an addressing mechanism in the BICC protocol which is specific to ITU-T E.164 addresses.

SUMMARY

In order to maximise the flexibility of the BICC protocol, it is desirable to avoid making it specific to a given transport technology, e.g. IP or AAL2. This will necessitate the provision of an addressing mechanism within the BICC protocol which caters for different address formats. This flexibility is not afforded by the current proposal to restrict BICC addressing to the use of E.164 addresses.

The inventors of the present invention have recognised that a flexible addressing mechanism suitable for use in the BICC protocol is provided by ITU-T recommendation X.213 which defines the so-called Network Service Access Point (NSAP) addressing format.

According to a first aspect of the present invention there is provided a method of signalling in a communications system comprising a Call Control level and a Bearer Control level, where the Call Control level comprises a plurality of Media Gateway Controllers and the Bearer Control level comprises a plurality of Media Gateways each of which is controlled by a Media Gateway Controller, the method comprising allocating to each Media Gateway at least one address, which address corresponds to one of a plurality of different addressing formats, and conveying these addresses between peer Media Gateway Controllers by encapsulating them using the Network Service Access Point (NSAP) addressing format.

The present invention may be used in a telecommunications network in which the Call Control level is used to establish and control call connections, e.g. between a calling party and a called party, at the Bearer Control level.

The Media Gateways provide access to transport networks which extend between peer Media Gateways. These transport networks may be, for example, IP, AAL2, or ATM networks. The format of the at least one address allocated to a Media Gateway is the format used by a transport network to which that Media Gateway provides access. Where a Media Gateway provides access to two or more transport networks, the Media Gateway may be allocated respective addresses.

According to a second aspect of the present invention there is provided a communications system comprising:

a Call Control level comprising a plurality of Media Gateway Controllers; and a Bearer Control level comprising a plurality of Media Gateways each of which is controlled by a Media Gateway Controller and each of which is allocated at least one address which address corresponds to one of a plurality of different addressing formats, wherein said peer Media Gateway Controllers are arranged to communicate Media Gateway addresses by encapsulating them using the Network Service Access Point (NSAP) addressing format.

According to a third aspect of the present invention there is provided a Media Gateway Controller of a communications system, the Media Gateway Controller comprising:

means for communicating with at least one Media Gateway Controller for the purpose of establishing and controlling call connections over a transport network to which the Media Gateway is coupled, the media gateway being allocated at least one address which address corresponds to one of a plurality of different addressing formats; and means for communicating with at least one peer Media Gateway Controller using a Bearer Independent Call Control (BICC) protocol, the BICC protocol conveying Media Gateway addresses by encapsulating them using the Network Service Access Point (NSAP) addressing format.

DETAILED DESCRIPTION

Figure 1:
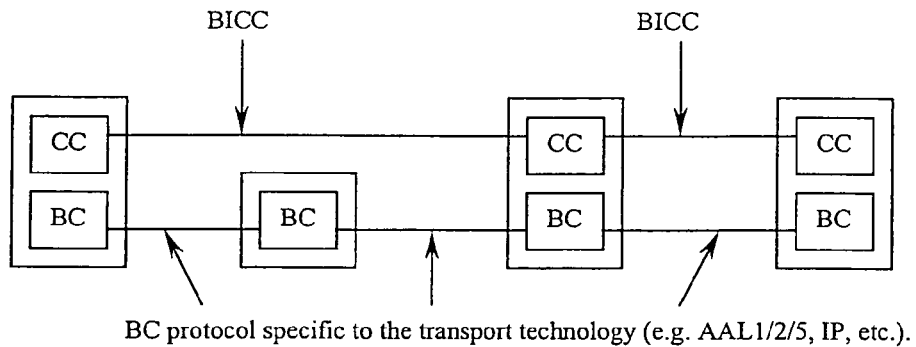
FIG. 1 illustrates a telecommunications network in which the Call Control level is independent of the Bearer level.
Figure 2:
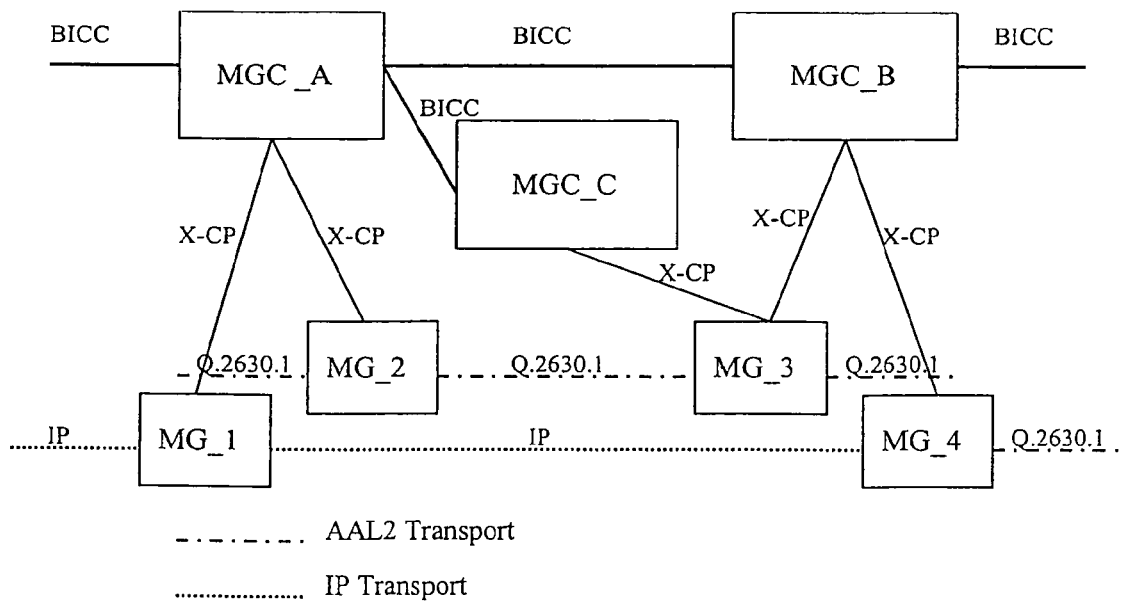
FIG. 2 illustrates a telecommunications network comprising Media Gateway Controllers and Media Gateways.

FIG. 1 illustrates in very general terms a telecommunications network in which signalling points are split into Media Gateway Controllers and Media Gateways, where the Media Gateway Controllers form a Call Control (CC) layer and the Media Gateways form a Bearer Control (BC) layer. FIG. 2 provides a more detailed illustration of an example network.

The CC level comprises a number of Media Gateway Controllers (MGC_A, MGC_B, MGC_C) whilst the BC level comprises a number of Media Gateways (MG_1 to MG_4). As is apparent from FIG. 2, each of the Media Gateway Controllers is arranged to control either one or two Media Gateways via an open interface (X-CP_1 to X-CP_3). A first pair of Media Gateways (MG_1, MG_4) provide a bearer connection over an intervening IP transport network, whilst a second pair of Media Gateways (MG_2, MG_3) provide a bearer connection over an intervening AAL2 network which uses the Q.2630.1 signalling protocol. In addition, Media Gateway MG_1 is connected to a second IP network whilst Gateways MG_2 to MG_4 are connected to respective second, third, and fourth AAL2 networks.

In order to send and receive data over a transport network (IP or AAL2), a Media Gateway must have an address in that network, the address using the network's addressing format. Thus, for example, the Media Gateways MG_1 and MG_4 must be allocated an IP address for use over the intervening IP network. Media Gateway MG_1 may use that same address to communicate over the second IP network or it may be allocated a different address for use in that network. Similarly, the Media Gateways MG_2 to MG_4 must be allocated an AAL2 address for use in the AAL2 networks with which they communicate. The actual process by which these transport network addresses are allocated will not be described here in detail. It is suffice to note that an address allocated to a Media Gateway for use over a given transport network will be unique within that network.

Figure 3:
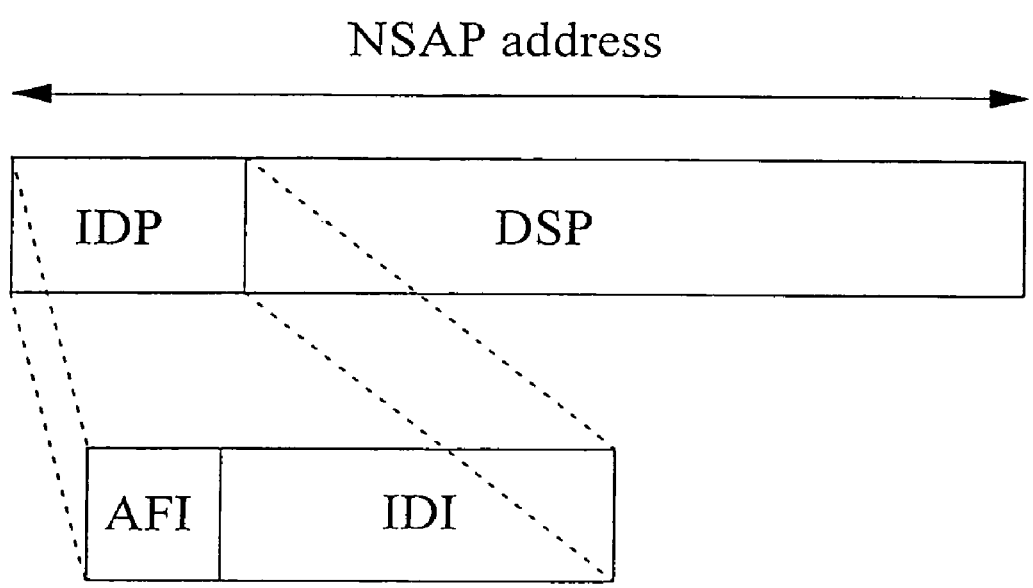
FIG. 3 illustrates the structure of an NSAP address.

In order to allow the BICC protocol to be compatible with a range of transport networks, it is proposed here to use in that protocol the addressing format defined by ITU-T recommendation X.213. This is known as the Network Service Access Point (NSAP) addressing format. An NSAP address has the structure illustrated in FIG. 3.

The initial domain part of the NSAP address consists of two parts. The first part is the authority and format identifier (AFI) and the second part is the initial domain identifier (IDI). The authority and format identifier (AFI) specifies:

a) the format of the IDI;

b) the network addressing authority responsible for allocating values of the IDI;

c) whether or not leading zero digits in the IDI are significant; and d) the abstract syntax of the DSP.

The initial domain identifier specifies:

a) the network addressing domain from which values of the DSP are allocated; and b) the network addressing authority responsible for allocating values of the DSP from that domain.

The semantics of the DSP are determined by the network addressing authority identified by the IDI.

Figure 4:
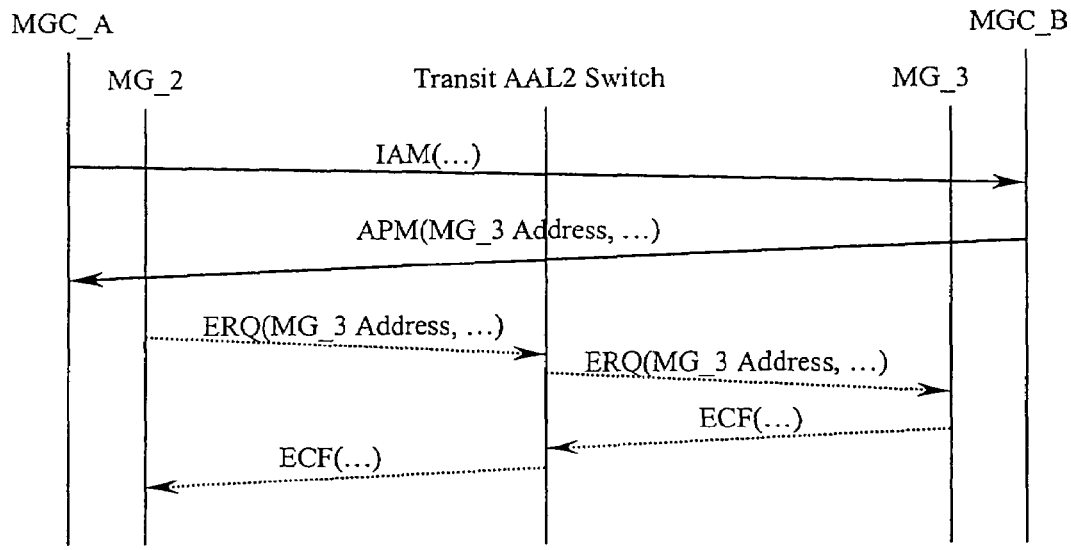
FIG. 4 illustrates a forward call set-up process in the network of FIG. 2.

FIG. 4 illustrates a first call set-up scenario, i.e. a forward bearer set up scenario. In this example, signalling is conducted over the CC level between Media Gateway Controllers MGC_A and MGC_B to establish a bearer level connection between Media Gateways MG_2 and MG_3. The process commences with an Initial Address Message (IAM) being sent from Media Gateway Controller MGC_A to Media Gateway Controller MGC_B. Media Gateway Controller MG_B responds to receipt of this message by returning to Media Gateway Controller MGC_A an APplication transport Mechanism (APM—defined in Q.765) message. The APM message contains an NSAP address which in turn contains the address of the Media Gateway MG_3 in the AAL2 network linking Media Gateway MG_2 and Media Gateway MG_3. Media Gateway Controller MGC_A passes the AAL2 address of Media Gateway MG_3 to Media Gateway MG_2. Media Gateway MG_2 then sends an Establish ReQuest (ERQ) message containing in its destination address field the AAL2 address of Media Gateway MG_3. Media Gateway MG_3 can then return a confirmation Establish ConFirm (ECF) message back to MG_2. Both the ERQ and the ECF messages are defined by the Q.2630.1 signalling protocol.

Figure 5:
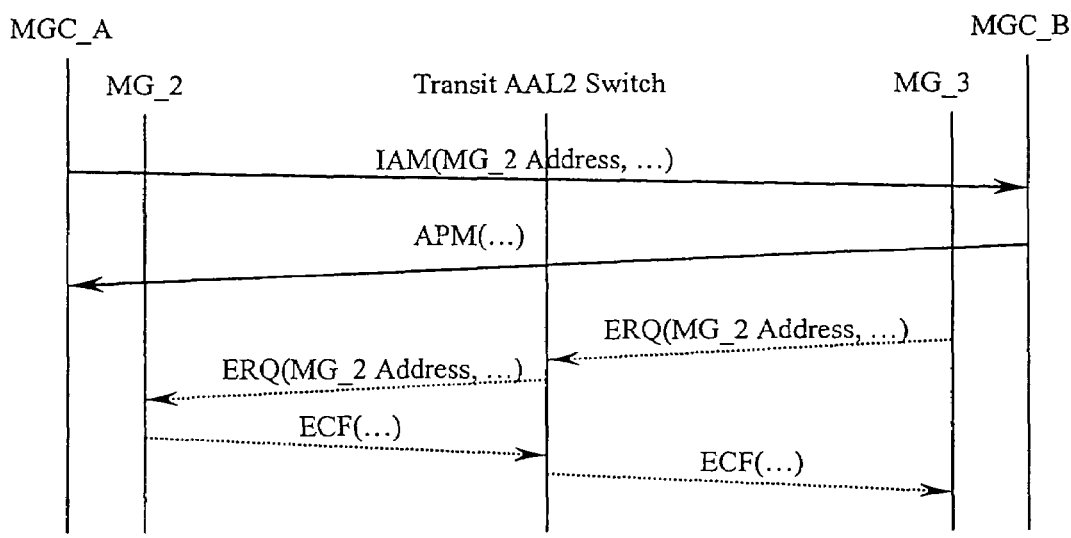
FIG. 5 illustrates a backward call set-up process in the network of FIG. 2.

FIG. 5 illustrates a backward bearer set up scenario in which the IAM message sent from the Media Gateway Controller MGC_A contains the AAL2 address, encapsulated in NSAP format, of Media Gateway MG_2. An ERQ message, including in its destination address field the AAL2 address of Media Gateway MG_2, is then sent from the Media Gateway MG_3. The ECF message is subsequently returned from the Media Gateway MG_2 to Media Gateway MG_3.

It will be appreciated by the person of skill in the art that various modifications may be made to the above described embodiment without departing from the scope of the present invention.

What is claimed is:

1. A method of signalling in a communications system comprising a Call Control level and a Bearer Control level, where the Call Control level comprises a plurality of Media Gateway Controllers and the Bearer Control level comprises a plurality of Media Gateways each of which is controlled by a Media Gateway Controller, the method comprising allocating to each of said plurality of Media Gateways at least one address, wherein said at least one address corresponds to one of a plurality of different addressing formats, and conveying said at least one address between peer Media Gateway Controllers using Bearer Independent Call Control (BICC) or Transport Independent Call Control (TICC) by encapsulating said at least one address using the Network Service Access Point (NSAP) addressing format as defined in ITU-T recommendation X.213.

2. A method according to claim 1, wherein the communications system is a telecommunications network in which the Call Control level is used to establish and control call connections between a calling party and a called party at the Bearer Control level.

3. A method according to claim 1, wherein the plurality of Media Gateways provide access to transport networks which extend between peer Media Gateways, and the transport networks use one of IP, AAL2, or ATM transmission mechanisms.

4. A method according to claim 1, wherein the format of the at least one address allocated to a Media Gateway is the format used by a transport network to which that Media Gateway provides access.

5. A communications system comprising;
   a Call Control level comprising a plurality of Media Gateway Controllers; and
   a Bearer Control level comprising a plurality of Media Gateways each of which is controlled by a Media Gateway Controller and each of which is allocated at least one address, wherein said at least one address corresponds to one of a plurality of different addressing formats,
   wherein each said Media Gateway Controller communicates Media Gateway addresses using Bearer Independent Call Control (BICC) or Transport Independent Call Control (TICC) by encapsulating said addresses using the Network Service Access Point (NSAP) addressing format as defined in ITU-T recommendation X.213.

6. A Media Gateway Controller of a communications system, the Media Gateway Controller comprising:
   means for communicating with at least one Media Gateway for the purpose of establishing and controlling call connections over a transport network to which the Media Gateway is coupled, the Media Gateway being allocated at least one address, wherein said at least one address corresponds to one of a plurality of different addressing formats; and
   means for communicating with at least one peer Media Gateway Controller using a Bearer Independent Call Control (BICC) protocol, a BICC protocol conveying Media Gateway addresses by encapsulating said addresses using the Network Service Access Point (NSAP) addressing format as defined in ITU-T recommendation X.213.

* * * * *